United States Patent
Koyama

(10) Patent No.: US 7,087,695 B2
(45) Date of Patent: Aug. 8, 2006

(54) GAS BARRIER(METH)ACRYLATE RESIN CURED PRODUCT

(75) Inventor: Takeshi Koyama, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 10/912,107

(22) Filed: Aug. 6, 2004

(65) Prior Publication Data

US 2005/0032928 A1 Feb. 10, 2005

(30) Foreign Application Priority Data

Aug. 7, 2003 (JP) ............................. 2003-288909

(51) Int. Cl.
*C08F 20/10* (2006.01)

(52) U.S. Cl. .................... 526/318; 526/292.2; 526/312

(58) Field of Classification Search ................ 525/123, 525/127, 128, 395, 440, 409; 526/318, 292.2, 526/312

See application file for complete search history.

(56) References Cited

U.S. PATENT DOCUMENTS 4,408,034 A * 10/1983 Kazama et al. ................ 528/54

5,688,632 A * 11/1997 Kashio et al. ........... 430/281.1

FOREIGN PATENT DOCUMENTS

DE 197 05 963 A 8/1998

\* cited by examiner

*Primary Examiner*—Ling-Sui Choi
(74) *Attorney, Agent, or Firm*—Antonelli, Terry, Stout and Kraus, LLP.

(57) ABSTRACT

The (meth)acrylate resin cured product of the present invention is produced by ultraviolet-curing and/or heat-curing a (meth)acrylate derivative. The (meth)acrylate resin cured product contains a skeletal structure represented by the following formula 1:

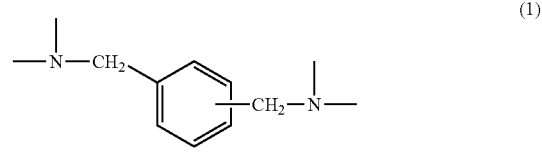

(1)

in a high content to exhibit high gas barrier properties and a good adhesion to various substrate materials.

12 Claims, No Drawings

GAS BARRIER(METH)ACRYLATE RESIN CURED PRODUCT

BACKGROUND OF THE INVENTION

1. Field of the Invention

The present invention relates to a gas barrier (meth)acrylate resin cured product, more particularly to a cured product obtained by ultraviolet-curing or heat-curing a (meth)acrylate derivative. The gas barrier (meth)acrylate resin cured product of the present invention is widely applicable to various industrial fields such as coating films for corrosion prevention and decorative finish, packaging materials for foods and medicines which require high gas barrier properties, adhesive layers for laminating films, etc.

2. Description of the Prior Art

Well-known gas barrier materials include polyvinylidene chloride and vinylidene chloride copolymer (hereinafter referred to as "PVDC"). Particularly, coated PVDC films are known as laminated films which are highly barrier against oxygen gas and moisture. Since PVDC is little moisture-absorbent and shows high gas barrier properties under high humidity conditions, PVDC can be coated with various substrate films irrespective of their moisture permeability. With its gas barrier properties, the laminated film is used for packaging various foods irrespective of being dry or wet. After use, these packaging materials are discarded as domestic wastes. However, PVDC generates harmful gas upon combustion and produces highly carcinogenic organic chlorine compounds upon incineration at low temperatures. Therefore, it has been strongly desired to substitute other materials for PVDC.

Polyvinyl alcohol (PVA) films are well known as another gas barrier material free from producing the organic chlorine compounds. PVA films are excellent in oxygen gas barrier properties when the moisture absorption is low. However, PVA films are highly moisture-absorbent and its oxygen gas barrier properties are steeply lowered at a relative humidity exceeding 70% to make PVA films less practical.

It is reported that an amine-cured epoxy resin has gas barrier properties higher than the above composition (polyvinyl alcohol-based (PVA-based) film) and exhibits improved gas barrier properties under high humidity conditions (JP 7-91367B and JP 7-91368B). However, a large amount of non-reacted amine groups having active hydrogen remains in the amine-cured epoxy resin. Therefore, when coated to metal, concrete, etc. to prevent rust and corrosion, there may be problems of failing to obtain excellent functions inherent to epoxy resin such as adhesiveness, heat resistance, chemical resistance and electric characteristics.

Also disclosed are a gas barrier polyurethane resin and a gas barrier film containing it (JP 2000-98047A), a gas barrier laminated stretch film made of a polyurethane thermoplastic elastomer (JP 7-112518A), and a polyurethane composite material having its gas barrier properties improved by a layered clay mineral (JP 10-168305A). However, the proposed compositions are based on thermoplastic resins and not suitable as the coating composition. In addition, the proposed resins are poor in the adhesion to substrate materials. Therefore, when applied to the packaging materials for foods and medicines which require high gas barrier properties, the proposed gas barrier film should be coated with another adhesive on its both sides to, laminate it with substrate films. This increases the production costs of laminated films and complicates the laminating step, and there is some fear for affecting environment due to increased amount of waste which is a recent serious problem.

SUMMARY OF THE INVENTION

An object of the present invention is to provide a highly gas barrier resin cured product which is capable of producing by ultraviolet-curing or heat-curing, and coating films, adhesive layers and films made thereof.

As a result of extensive research for achieving the above object, the inventor has found that a specific cured product produced by ultraviolet-curing and/or heat-curing a (meth)acrylate derivative is excellent in gas barrier properties, transparency, adhesive properties and gloss of coating film surface. The present invention has been accomplished on the basis of this finding.

Thus, the present invention relates to a (meth)acrylate resin cured product produced by ultraviolet-curing and/or heat-curing a (meth)acrylate derivative, the cured product containing a skeletal structure represented by the following formula 1:

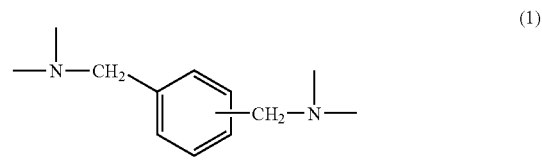

in an amount of 15% by weight or more.

DETAILED DESCRIPTION OF THE INVENTION

The (meth)acrylate derivative referred to in the present invention is represented by the following formula 2.

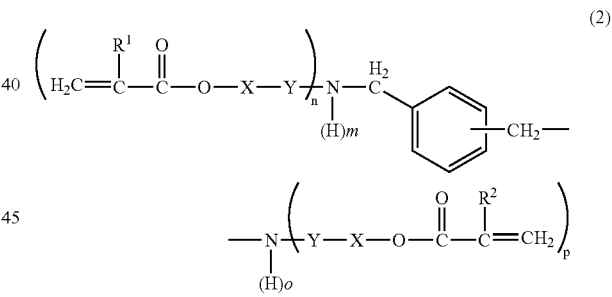

In the formula 2, X is straight-chain or branched-chain C2 to C6 alkylene group, straight-chain or branched-chain C2 to C6 hydroxyalkylene group or —$(R^3O)_qR^3$— wherein $R^3$ is C2 to C5 alkylene group and q is an integer of 1 to 5. Preferably, X is —$CH_2$—$CH_2$—, —$CH(CH_3)$—$CH_2$—, —$CH_2$—$CH(OH)$—$CH_2$—, —$CH_2$—$C(CH_3)(OH)$—$CH_2$—, —$CH_2$—$CH(CH_2OH)$—, —$CH_2$—$C(CH_3)(CH_2OH)$— or —$(CH_2CH_2O)_2CH_2CH_2$—. The above bivalent groups are bonded to Y through the left-hand bondings.

Y is a single bond or forms urethane linkage, —O—C(=O)—N(H)m- or —N(H)o-C(=O)—O—, together with nitrogen atom to which Y is bonded.

$R^1$ and $R^2$ are each independently hydrogen atom or methyl group.

The suffix m is 0 or 1, the suffix n is 1 or 2 and m+n is 2.
The suffix o is 0 or 1, the suffix p is 1 or 2 and o+p is 2.
The (meth)acrylate derivatives of the formula 2 are classified into three basic groups: (1) a (meth)acrylate derivative I obtained by the reaction of a xylylenediamine having (substituted) glycidyl groups on its nitrogen atoms and (meth)acrylic acid or the reaction of xylylenediamine and a (substituted) glycidyl (meth)acrylate, (2) a (meth)acrylate derivative II having urethane linkage obtained by the reaction of xylylene diisocyanate and a hydroxyalkyl (meth)acrylate, and (3) a (meth)acrylate derivative III obtained by the reaction of a xylylene diamine-alkylene oxide adduct (polyol compound) and an alkyl (meth)acrylate.

The cured product obtained by ultraviolet-curing and/or heat-curing the (meth)acrylate derivative contains the skeletal structure of the following formula 1:

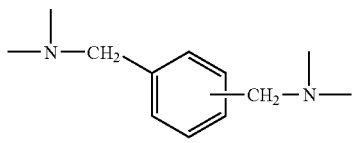

(1)

in a high content, thereby to exhibit high gas barrier properties and a good adhesion to the substrate materials. The content of the skeletal structure of the formula 1 in the cured product is 15% by weight or more, preferably 15 to 70% by weight, and more preferably 18 to 60% by weight.

The (meth)acrylate derivative which forms the gas barrier (meth)acrylate resin cured product will be described below.

The (meth)acrylate derivative I is produced, for example, by reacting xylylenediamine with epihalohydrin or β-methylepihalohydrin and reacting the resultant epoxy compound with (meth)acrylic acid or its ester. More specifically, a mixture of xylylenediamine and epihalohydrin in a molar ratio of 1/4 is heated at room temperature to 60° C. to allow the addition reaction to proceed, thereby producing a teraepoxy compound. By adding 4 to 5 mol of acrylic acid per one mole of the teraepoxy compound and heating the mixture at 100 to 150° C., the esterification accompanied by the elimination of water is allowed to proceed to obtain the aimed compound. Alternatively, by adding 4 to 5 mol of methyl acrylate per one mole of the teraepoxy compound and heating the mixture at 100 to 150° C., the ester interchange accompanied by the elimination of methanol is allowed to proceed to obtain the aimed compound.

Alternatively, the (meth)acrylate derivative I may be produced by the reaction of one mole of xylylenediamine and 4 mol of the (substituted) glycidyl (meth)acrylate at room temperature to 80° C.

In any of the above reactions, it is preferred to inhibit the polymerization of (meth)acrylate groups by blowing a small amount of air into the reaction system or to add a polymerization inhibitor to the reaction system. Examples of the polymerization inhibitor include a phenol-based polymerization inhibitor such as hydroquinone, toluhydroquinone, p-benzoquinone, monomethyl ether hydroquinone, phenothiazine, mono-tert-butylhydroquinone, 2,5-di-tert-butylhydroquinone and p-tert-butylcatechol, and a metal-containing polymerization inhibitor such as copper naphthenate and zinc naphthenate. The reaction may be carried out in the absence of solvent or, if desired, in the presence of an organic solvent or a reactive diluent. Examples of the organic solvent include aromatic solvents such as xylene and toluene; ester solvents such as ethyl acetate and butyl acetate; ketone solvents such as methyl ethyl ketone and methyl isobutyl ketone; and aliphatic solvents such as pentane and hexane. Examples of the reactive diluents include 2-(2-ethoxyethoxy)ethyl acrylate, phenoxyethyl acrylate, 1,6-hexanediol diacrylate, tetraethylene glycol diacrylate, neopentyl glycol diacrylate, tripropylene glycol diacrylate, hydroxypivalate neopentyl glycol diacrylate, polyethylene glycol diacrylate, trimethylolpropane triacrylate, styrene, vinyltoluene, p-metylstyrene and N-vinylpyrrolidone.

The (meth)acrylate derivative II is produced by the reaction of xylylene diisocyanate and a C2 to C6 hydroxylalkyl (meth)acrylate such as 2-hydroxypropyl (meth)acrylate and 2-hydroxyethyl (meth)acrylate. The C2 to C6 hydroxylalkyl (meth)acrylates may be used alone or in mixture. The reaction is carried out at about 30 to 120° C., preferably about 40 to 90° C. The reaction may be carried out in the presence of a catalyst for promoting the formation of urethane such as dibutyltin dilaurate, dioctyltin diacetate, dibutyltin oxide, lead octenoate, triethylamine, morpholine and piperazine. The polymerization of (meth)acrylate groups during the reaction can be prevented by blowing a small amount of dry air or adding a polymerization inhibitor, for example, a phenol-based polymerization inhibitor such as hydroquinone, toluhydroquinone, p-benzoquinone, monomethyl ether hydroquinone, phenothiazine, mono-tert-butylhydroquinone, 2,5-di-tert-butylhydroquinone and p-tert-butylcatechol, and a metal-containing polymerization inhibitor such as copper naphthenate and zinc naphthenate. The reaction may be carried out in the absence of solvent or, if desired, in the presence of an organic solvent or a reactive diluent. Examples of the organic solvent include aromatic solvents such as xylene and toluene; ester solvents such as ethyl acetate and butyl acetate; ketone solvents such as methyl ethyl ketone and methyl isobutyl ketone; and aliphatic solvents such as pentane and hexane. Examples of the reactive diluents include 2-(2-ethoxyethoxy)ethyl acrylate, phenoxyethyl acrylate, 1,6-hexanediol diacrylate, tetraethylene glycol diacrylate, neopentyl glycol diacrylate, tripropylene glycol diacrylate, hydroxypivalate neopentyl glycol diacrylate, polyethylene glycol diacrylate, trimethylolpropane triacrylate, styrene, vinyltoluene, p-metylstyrene and N-vinylpyrrolidone. The organic solvent and the reactive diluent are used in an amount of 0 to 50% by weight, preferably 0 to 20% by weight based on the total amount of xylylene diisocyanate and the C2 to C6 hydroxylalkyl (meth)acrylate.

The (meth)acrylate derivative III is produced by the reaction of a polyol compound obtained by the addition of a C2 to C6 alkylene oxide to xylylenediamine and C2 to C5 alkyl (meth)acrylate such as methyl acrylate and methyl methacrylate. The (meth)acrylate derivative III is a tetrafunctional (meth)acrylate compound having xylylenediamine skeleton which is produced by adding at least 4 mol of the alkylene oxide (AO) to one mole of xylylenediamine (XDA) such as m-xylylenediamine to obtain a addition product (hereinafter referred to as "XDA-AO4" when 4 mol of the alkylene oxide is added to one mole of xylylenediamine), and then esterifying XDA-AO4 into acrylic ester or methacrylic ester in the manner described below. The esterification is carried out by ester interchange reaction in which 2 or more equivalents of C2 to C5 alkyl (meth)acrylate such as methyl acrylate and methyl methacrylate are reacted with one equivalent of hydroxyl group of XDA-AO4 at about 60 to 180° C., preferably 80 to 100° C. in the presence of an ester interchange catalyst such as dibutyltin oxide in an amount of 0.1 to 10 mol %, preferably 2 to 6 mol % based on one mole of XDA-AO4 and further in the presence of a polymerization inhibitor such as hydroquinone monomethyl ether and hydroquinone in an amount of 20 to 5000 ppm, preferably 1000 to 3000 ppm of the C2 to C5 alkyl (meth)

acrylate. The reaction time of the ester interchange reaction is 0.5 to 3 h. After the reaction, the methanol generated during the reaction is removed by azeotropy with excess C2 to C5 alkyl (meth)acrylate. Finally, excessively charged C2 to C5 alkyl (meth)acrylate still remaining is removed by vacuum distillation.

The (meth)acrylate derivatives, i.e., the (meth)acrylate derivatives I to III may be used alone or in combination of two or more. The (meth)acrylate resin cured product of the present invention is produced by curing a composition prepared by blending the (meth)acrylate derivative optionally with an acrylic reactive diluent, a vinyl reactive diluent, an organic solvent, a photopolymerization initiator, a heat polymerization initiator, and other additives. The blending amount of the additives should be suitably selected so that the resultant (meth)acrylate resin cured product contains the skeletal structure of the formula 1 in an amount of 15% by weight or more, while taking the content of the skeletal structure of the formula 1 in the (meth)acrylate derivative. Then the blend is subjected to ultraviolet curing and/or heat curing.

Examples of the acrylic reactive diluents include 2-(2-ethoxyethoxy)ethyl acrylate, phenoxyethyl acrylate, 1,6-hexanediol diacrylate, tetraethylene glycol diacrylate, neopentyl glycol diacrylate, tripropylene glycol diacrylate, hydroxypivalate neopentyl glycol diacrylate, polyethylene glycol diacrylate, trimethylolpropane triacrylate, pentaerythritol triacrylate, pentaerythritol tetraacrylate and dipentaerythritol hexaarylate. The blending amount is 0 to 50% by weight, preferably 0 to 20% by weight of the (meth)acrylate derivative.

Examples of the vinyl reactive diluents include styrene, vinyltoluene, p-metylstyrene and N-vinylpyrrolidone. The blending amount is 0 to 50% by weight, preferably 0 to 20% by weight of the (meth)acrylate derivative.

Examples of the organic solvents include aromatic solvents such as xylene and toluene; ester solvents such as ethyl acetate and butyl acetate; ketone solvents such as methyl ethyl ketone and methyl isobutyl ketone; aliphatic solvents such as pentane and hexane; and alcohol solvents such as methanol, ethanol, isopropanol and butanol. The blending amount is 0 to 50% by weight, preferably 0 to 20% by weight of the (meth)acrylate derivative.

Examples of the photopolymerization initiators include benzoin compounds such as benzoin, benzoin methyl ether, benzoin ethyl ether, benzoin isopropyl ether and benzoin isobutyl ether; acetophenone compounds such as 2,2-dimethoxy-2-pehenylacetophenone (benzyl dimethyl ketal) 4-phenoxydichloroacetophenone, 4-tert-butyldichloroacetophenone, 4-tert-butyltrichloroacetophenone, diethoxyacetophenone, 2-hydroxy-2-methyl-1-phenylpropane-1-one, 1-(4-isopropylphenyl)-2-hydroxy-2-methylpropane-1-one, 1-(4-dodecylphenyl)-2-hydroxy-2-methylpropane-1-one, 4-(2-hydroxyethoxy)phenyl 2-hydroxy-2-propyl ketone, 1-hydroxycyclohexyl phenyl ketone ("Irgacure 184", tradename of Ciba Sepecialty Chemicals Co., Ltd.) and 2-methyl-1-[4-(methylthio)phenyl]-2-morpholinepropane-1; benzophenone compounds such as benzophenone and acrylated benzophenone; and thioxanthone compounds such as thioxanthone, 2-chlorothioxanthone, 2-methylthioxanthone, 2,4-dimethylthioxanthone, isopropylthioxanthone and 2,4-dichlorothioxanthone. The blending amount is about 1 to 10 parts by weight, preferably about 2 to 5 parts by weight per 100 parts by weight the (meth)acrylate derivative. If less than 1 part by weight, the curing inside a coating film is insufficient to reduce the physical properties. A blending amount exceeding 10 parts by weight is disadvantageous because no additional effect on improving the curability is obtained to increase the cost.

Examples of the heat polymerization initiators include benzoperoxide and $\alpha, \alpha'$-azoisobutyronitrile. The blending amount is about 1 to 10 parts by weight, preferably about 2 to 5 parts by weight per 100 parts by weight the (meth)acrylate derivative. If less than 1 part by weight, the curing inside a coating film is insufficient to reduce the physical properties. A blending amount exceeding 10 parts by weight is disadvantageous because no additional effect on improving the curability is obtained to increase the cost.

In the present invention, if desired, light stabilizer, ultraviolet absorber, cissing inhibitor, pigment dispersant, flow modifier, antistatic agent and other additives may be added in an amount usually employed by a person skilled in the art.

To enhance the surface wettability of coating film, a wetting agent such as silicone and an acrylic compound may be added. Examples of suitable wetting agents include BYK331, BYK333, BYK348 and BYK381 each available from BYK-Chemie GmbH. The blending amount of the wetting agent, if used, is preferably 0.01 to 2.0% by weight of the (meth)acrylate derivative.

To improve the adhesion to various substrate materials immediately after coating, the (meth)acrylate derivative may be added with a tackifier such as xylene resin, terpene resin, phenol resin and rosin resin in an amount of 0.01 to 5.0% by weight of the (meth)acrylate derivative.

In addition, to enhance gas barrier properties, impact strength, heat resistance of the resultant (meth)acrylate resin cured product of the present invention, an inorganic filler such as silica, alumina, mica, talc, aluminum flake and glass flake may be added to the (meth)acrylate derivative. In view of the transparency of films, the inorganic filler is preferably flat in its shape. If used, the inorganic filler is added in an amount of 0.01 to 10.0% by weight of the (meth)acrylate derivative.

To improve the adhesion of the adhesive layer comprising the (meth)acrylate resin cured product to plastic films, metal foils, papers, etc., a coupling agent such as silane coupling agent and titanium coupling agent may be added to the (meth)acrylate derivative in an amount of 0.01 to 5.0% by weight of the adhesive composition.

The (meth)acrylate derivative may be coated to substrate materials by a known method such as spray coating, flow coating and roller coating.

The lamination of various film materials by using the (meth)acrylate derivative may be effected by a known laminating method such as dry laminating, non-solvent laminating and extrusion laminating.

The wet coating is cured by irradiating the coating surface with ultraviolet rays from an ultraviolet source such as a high-pressure mercury lamp and metal halide lamp. The irradiation is preferably carried out under the conditions of an output of 80 to 160 W/cm, an irradiation intensity of 100 to 150 mW/cm$^2$ (350 nm wave length) and an integrated quantity of light of 50 to 200 mJ/cm$^2$ (350 nm wave length).

The heating of the coating surface for curing a wet coating may be carried out by using a dryer, an infrared heater, etc. The heating temperature is preferably 50 to 300° C. If less than 50° C., the polymerization is difficult to occur. If higher than 300° C., there may be caused a problem of the thermal decomposition of polymerized product.

The thickness of the cured product layer formed by coating the (meth)acrylate derivative to various substrate materials and subsequent drying, lamination and heat treatment is preferably 0.1 to 100 μm in view of practical use. If less than 0.1 μm, sufficient gas barrier properties and adhesion are not attained. If exceeding 100 μm, it is difficult to make the thickness of the adhesive layer uniform.

In addition to a good adhesion to various film materials, the (meth)acrylate derivative provides a cured product with high gas barrier properties. Therefore, the (meth)acrylate resin cured product formed from the (meth)acrylate derivative exhibits extremely high gas barrier properties without using a gas barrier layer generally used, such as PVDC coating layer, polyvinyl alcohol (PVA) coating layer, ethylene-vinyl alcohol copolymer (EVOH) film layer, m-xylylene adipamide film layer and alumina- or silica-deposited inorganic film layer. By using the (meth)acrylate resin cured product of the present invention as an adhesive layer for laminating a known gas barrier material and a sealant material, the resultant laminate film is extremely improved in its gas barrier properties. Since the (meth)acrylate resin cured product of the present invention is excellent also in toughness and resistance to moist heat, gas barrier laminate films excellent in impact strength and resistance to retort treatment and coating films of excellent performance can be obtained.

The present invention will be described in more detail with reference to the following examples. However, it should be noted that the following examples are only illustrative and not intended to limit the scope of the invention thereto. The (meth)acrylate derivatives used in the examples were produced in the following methods.

Acrylate Derivative A

Into a reaction vessel, were charged one mole of m-xylylene diisocyanate, 0.18 g of a urethane-forming catalyst (dibutyltin dilaurate) and a polymerization inhibitor comprising 0.3 g of triphenylantimony and 0.07 g of toluhydroquinone. The mixture was heated to 60° C. under stirring while blowing dry air. Then, one mole of 2-hydroxyethyl acrylate was added dropwise over one hour. After the addition, the stirring was continued at 60° C. for 4 h. When the absorption attributable to isocyanate group was confirmed to be disappeared in IR spectra, 0.07 g of additional toluhydroquinone as the polymerization inhibitor was added and the reaction was stopped, thereby obtaining the acrylate derivative A.

Acrylate Derivative B

Into a reaction vessel, were charged one mole of 1,3-bis (isocyanatomethyl)cyclohexane, 0.18 g of a urethane-forming catalyst (dibutyltin dilaurate) and a polymerization inhibitor comprising 0.3 g of triphenylantimony and 0.07 g of toluhydroquinone. The mixture was heated to 60° C. under stirring while blowing dry air. Then, one mole of 2-hydroxyethyl acrylate was added dropwise over one hour. After the addition, the stirring was continued at 60° C. for 4 h. When the absorption attributable to isocyanate group was confirmed to be disappeared in IR spectra, 0.07 g of additional toluhydroquinone as the polymerization inhibitor was added and the reaction was stopped, thereby obtaining the acrylate derivative B.

Acrylate Derivative C

Into a reaction vessel, were charged one mole of isophorone diisocyanate, 0.18 g of a urethane-forming catalyst (dibutyltin dilaurate) and a polymerization inhibitor comprising 0.3 g of triphenylantimony and 0.07 g of toluhydroquinone. The mixture was heated to 60° C. under stirring while blowing dry air. Then, one mole of 2-hydroxyethyl acrylate was added dropwise over one hour. After the addition, the stirring was continued at 60° C. for 4 h. When the absorption attributable to isocyanate group was confirmed to be disappeared in IR spectra, 0.07 g of additional toluhydroquinone as the polymerization inhibitor was added and the reaction was stopped, thereby obtaining the acrylate derivative C.

Acrylate Derivative D

Into a reaction vessel, were charged one mole of a glycidyl amino-containing epoxy resin which is derived from xylylenediamine ("Tetrad-X" available from Mitsubishi Gas Chemical Company, Inc.) and a polymerization inhibitor comprising 0.3 g of triphenylantimony and 0.07 g of toluhydroquinone. The mixture was heated to 80° C. under stirring while blowing dry air. Then, four moles of acrylic acid were added dropwise over one hour. After the addition, the stirring was continued at 80° C. for 4 h to complete the reaction. Then, 0.07 g of additional toluhydroquinone as the polymerization inhibitor was added to obtain the acrylate derivative D.

Methacrylate Derivative E

Into a reaction vessel, were charged one mole of a glycidyl amino-containing epoxy resin which is derived from xylylenediamine ("Tetrad-X" available from Mitsubishi Gas Chemical Company, Inc.) and a polymerization inhibitor comprising 0.3 g of triphenylantimony and 0.07 g of toluhydroquinone. The mixture was heated to 80° C. under stirring while blowing dry air. Then, four moles of methacrylic acid were added dropwise over one hour. After the addition, the stirring was continued at 80° C. for 8 h to complete the reaction. Then, 0.07 g of additional toluhydroquinone as the polymerization inhibitor was added to obtain the acrylate derivative E.

Acrylate Derivative F

Into a reaction vessel, were charged one mole of a bisphenol A epoxy resin ("Epikote 828" available from Japan Epoxy Resins Co., Ltd) and a polymerization inhibitor comprising 0.3 g of triphenylantimony and 0.07 g of toluhydroquinone. The mixture was heated to 80° C. under stirring while blowing dry air. Then, four moles of acrylic acid were added dropwise over one hour. After the addition, the stirring was continued at 80° C. for 4 h to complete the reaction. Then, 0.07 g of additional toluhydroquinone as the polymerization inhibitor was added to obtain the acrylate derivative F.

Methacrylate Derivative G

Into a reaction vessel equipped with a 5 mm-square MacMahon-packed column having a cocked fractionating column on its upper side, were charged 218.8 g of a MXDA/ethylene oxide adduct (¼ by mole) available from Aoki Oil Industrial Co., Ltd., 484.0 g of methyl acrylate (two equivalents per one equivalent of the hydroxyl group of MXDA/ethylene oxide adduct), 0.96 g of hydroquinone monomethyl ether (polymerization inhibitor), and 7.0 g of dibutyltin oxide (ester interchange catalyst). The mixture was subjected to total reflux under heating and stirring with the cock of the fractionating column closed for about one hour while blowing dry air. After one hour, the reflux ratio was maintained at 30 to distill away the methanol generated by ester interchange reaction as the azeotropic mixture with methyl acrylate. Although the azeotropic point of methyl acrylate and methanol is 63° C., the reflux occurred when the top temperature of the packed column reached 63±2° C. After allowing the reflux for 30 s, then the azeotropic mixture was distilled away by opening the cock of the fractionating column for one second. Upon allowing the reaction to further proceed, methanol became nearly not found in the distillate to increase the top temperature to around the boiling point of methyl acrylate. At this point, the reaction was discontinued. The remaining methyl acrylate was recovered by a rotary evaporator until the pressure was reduced to 3 to 4 mmHg. The crude product thus obtained was filtered to remove dibutyltin oxide, thereby obtaining the acrylate derivative G.

Measurement of Oxygen Transmission Coefficient

The oxygen transmission rate of a cured film was measured at 23° C. and 60% relative humidity by using an oxygen transmission meter ("OX-TRAN 10/50A" available from Modern Controls Co., Ltd.). From the results, the oxygen transmission coefficient of the film was calculated from the following equation:

$$1/R_1 = 1/R_2 + DFT/P$$

wherein $R_1$ is the oxygen transmission rate (ml/m²·day·MPa) of a coated plastic film, $R_2$ is the oxygen transmission rate (ml/m²·day·MPa) of a base film, DFT is the thickness (mm) of the cured film, and P is the oxygen transmission coefficient (ml·mm/m²·day·MPa) of the cured film.

EXAMPLE 1

Into 42 g of ethyl acetate, were dissolved 2.2 g of the acrylate derivative A, 0.07 g of Irgacure 184 (photopolymerization initiator) and 0.06 g of BYK 381. The resultant solution was coated to an oriented polypropylene (OPP) film of 20 μm thick by a No. 24 bar coater. After drying at 100° C., the dried coating was set at 100° C. for one minute and then leveled. The ultraviolet curing was carried out at a lamp distance of 25 cm and a line speed of 10 m/min by using a conveyor ultraviolet-curing apparatus equipped with a high-pressure mercury lamp of 80 W/cm and an aluminum mirror condenser. The ultraviolet energy was 74 mJ/cm² (sensor: "UVPZ-2365" available from Eye Graphics Co., Ltd.). The curing of the coating was completed by passing through the coating under the above ultraviolet-curing conditions three times. The thickness of the cured product was 12.3 μm. The content of the skeletal structure of the formula 1 in the cured product was 30.4% by weight. The cured film was evaluated for the oxygen barrier properties. The results are shown in Table 1.

EXAMPLE 2

Into 3.4 g of ethyl acetate, were dissolved 1.4 g of the acrylate derivative A, 0.6 g of the acrylate derivative B and 0.07 g of Irgacure 184 (photopolymerization initiator). The resultant solution was coated to OPP film of 20 μm thick by a No. 24 bar coater. After drying at 85° C., the dried coating was set at 85° C. for 20 s, leveled and then ultraviolet-cured in the same manner as in Example 1. The thickness of the cured product was 10.5 μm. The content of the skeletal structure of the formula 1 in the cured product was 21.0% by weight. The cured film was evaluated for the oxygen barrier properties. The results are shown in Table 1.

Comparative Example 1

Into 3.4 g of ethyl acetate, were dissolved 1.9 g of the acrylate derivative B and 0.07 g of Irgacure 184 (photopolymerization initiator). The resultant solution was coated to OPP film of 20 μm thick by a No. 24 bar coater. After drying at 85° C., the dried coating was set at 85° C. for 20 s, leveled and then ultraviolet-cured in the same manner as in Example 1. The thickness of the cured product was 10.3 μm. The content of the skeletal structure of the formula 1 in the cured product was 0.0% by weight. The cured film was evaluated for the oxygen barrier properties. The results are shown in Table 1.

Comparative Example 2

Into 3.4 g of ethyl acetate, were dissolved 1.9 g of the acrylate derivative C and 0.07 g of Irgacure 184 (photopolymerization initiator). The resultant solution was coated to OPP film of 20 μm thick by a No. 24 bar coater. After drying at 85° C., the dried coating was set at 85° C. for 20 s, leveled and then ultraviolet-cured in the same manner as in Example 1. The thickness of the cured product was 10.3 μm. The content of the skeletal structure of the formula 1 in the cured product was 0.0% by weight. The cured film was evaluated for the oxygen barrier properties. The results are shown in Table 1.

Comparative Example 3

Into 3.4 g of ethyl acetate, were dissolved 0.4 g of the acrylate derivative A, 1.5 g of the acrylate derivative C and 0.07 g of Irgacure 184 (photopolymerization initiator). The resultant solution was coated to OPP film of 20 μm thick by a No. 24 bar coater. After drying at 85° C., the dried coating was set at 85° C. for 20 s, leveled and then ultraviolet-cured in the same manner as in Example 1. The thickness of the cured product was 13.0 μm. The content of the skeletal structure of the formula 1 in the cured product was 6.4% by weight. The cured film was evaluated for the oxygen barrier properties. The results are shown in Table 1.

EXAMPLE 3

Into 1 g of ethyl acetate, were dissolved 4 g of the acrylate derivative D and 0.07 g of Irgacure 184 (photopolymerization initiator). The resultant solution was coated to a glass plate by a 100-μm applicator. After setting at 80° C. for one minute and leveling, the coating was ultraviolet-cured in the same manner as in Example 1. The cured film was pealed out of the glass plate to obtain a test piece. The thickness was 51.1 μm. The content of the skeletal structure of the formula 1 in the cured product was 20.4% by weight. The cured film was evaluated for the oxygen barrier properties. The results are shown in Table 1.

EXAMPLE 4

Into one gram of styrene (reactive diluent), were dissolved 4 g of the methacrylate derivative E and 0.07 g of benzoperoxide (heat polymerization initiator). The resultant solution was coated to a glass plate by a 100-μm applicator. The coating was heat-cured at 80° C. for 3 h. The cured film was pealed out of the glass plate to obtain a test piece. The thickness was 65.7 μm. The content of the skeletal structure of the formula 1 in the cured product was 17.0% by weight (50% of styrene was volatilized). The cured film was evaluated for the oxygen barrier properties. The results are shown in Table 1.

EXAMPLE 5

Into 1 g of ethyl acetate, were dissolved 4 g of the methacrylate derivative G and 0.07 g of Irgacure 184

(photopolymerization initiator). The resultant solution was coated to a glass plate by a 100-μm applicator. After setting at 80° C. for one minute and leveling, the coating was ultraviolet-cured in the same manner as in Example 1. The cured film was pealed out of the glass plate to obtain a test piece. The thickness was 49.0 μm. The content of the skeletal structure of the formula 1 in the cured product was 22.6% by weight. The cured film was evaluated for the oxygen barrier properties. The results are shown in Table 1.

Comparative Example 4

Into 1 g of ethyl acetate, were dissolved 4 g of the acrylate derivative F and 0.07 g of Irgacure 184 (photopolymerization initiator). The resultant solution was coated to a glass plate by a 100-μm applicator. After setting at 80° C. for one minute and leveling, the coating was ultraviolet-cured in the same manner as in Example 1. The cured film was pealed out of the glass plate to obtain a test piece. The thickness was 48.4 μm. The content of the skeletal structure of the formula 1 in the cured product was 0.0% by weight. The cured film was evaluated for the oxygen barrier properties. The results are shown in Table 1.

TABLE 1

| | Content of skeletal structure of formula 1 (% by weight) | Oxygen transmission rate (ml/m² · day · MPa) | Oxygen transmission coefficient (ml · mm/m² · day · MPa) |
|---|---|---|---|
| Examples | | | |
| 1 | 30.4 | 238 | 0.29 |
| 2 | 21.0 | 476 | 0.50 |
| 3 | 20.4 | 106 | 0.52 |
| 4 | 17.0 | 104 | 0.68 |
| 5 | 22.6 | 100 | 0.49 |
| Comparative Examples | | | |
| 1 | 0.0 | 1100 | 1.13 |
| 2 | 0.0 | 1500 | 1.83 |
| 3 | 6.4 | 770 | 1.00 |
| 4 | 0.0 | 974 | 4.68 |

EXAMPLE 6

Into 42 g of ethyl acetate, were dissolved 22 g of the acrylate derivative A, 0.7 g of Irgacure 184 (photopolymerization initiator) and 0.6 g of BYK 381. The resultant solution was coated to a cold-reduced carbon steel sheet (JIS G3141, 70×150×0.6 mm) which has been subjected to a sanding treatment (#240) with a 200-μm doctor blade and washed with xylene in advance. After drying at 100° C., the dried coating was set at 100° C. for one minute and then leveled. The ultraviolet curing was carried out at a lamp distance of 25 cm and a line speed of 5 m/min by using a conveyor ultraviolet-curing apparatus equipped with a high-pressure mercury lamp of 80 W/cm and an aluminum mirror condenser. The curing of the coating was completed by passing through the coating under the above ultraviolet-curing conditions three times. The content of the skeletal structure of the formula 1 in the cured product was 30.4% by weight. The visual appearance of the cured product was good. The pencil hardness was 2H and the result of a cross cut adhesion test was 100/100.

EXAMPLE 7

Into 4.2 g of ethyl acetate, were dissolved 2.2 g of the acrylate derivative A, 0.07 g of Irgacure 184 (photopolymerization initiator) and 0.06 g of BYK 381. The resultant solution was coated to a 20-μm oriented polypropylene film by using a bar coater No. 3 in a coating amount of 3 g/m² in terms of solid content. After drying at 85° C. for 10 s, the dried coating was set at 100° C. for one minute and then leveled. The ultraviolet curing was carried out at a lamp distance of 25 cm and a line speed of 10 m/min by using a conveyor ultraviolet-curing apparatus equipped with a high-pressure mercury lamp of 80 W/cm and an aluminum mirror condenser. The content of the skeletal structure of the formula 1 in the cured product was 30.4% by weight. A 30-μm polypropylene film was laminated to the coated surface by nip-rolling and aged at 35° C. for one day to obtain a laminate film. The laminate film was evaluated for the gas barrier properties and the laminate strength. The laminate film was transparent under a visual observation. The laminate strength measured by T-peel test at a peeling speed of 5 m/min (JIS K6854) was 50 g/15 mm. The oxygen transmission rate was 970 ml/m² ·day·MPa at 23° C. and 60% humidity.

The (meth)acrylate resin cured product of the present invention has a good adhesion to various substrate materials to exhibit high gas barrier properties. Therefore, it is useful as coating films for preventing metals from rusting and preventing concrete from being corroded and further useful as various gas barrier packaging materials. By using as a laminating adhesive layer, highly gas barrier laminate films for use as packaging materials can be produced without separately forming a gas barrier layer.

What is claimed is:

1. A (meth)acrylate resin cured product produced by ultraviolet-curing and/or heat-curing a (meth)acrylate derivative with adding a polymerization initiator, wherein the (meth)acrylate derivative is represented by the following formula 2:

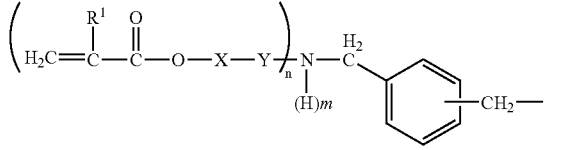

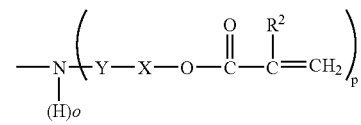

wherein X is a divalent group selected from the group consisting of straight-chain or branched-chain C2 to C6 alkylene group, straight-chain or branched-chain C2 to C6 hydroxyalkylene group and $—(R^3O)_qR^3—$ wherein $R^3$ is C2 to C5 alkylene group and q is an integer of 1 to 5; Y is a single bond or forms urethane linkage together with nitrogen atom to which Y is bonded; $R^1$ and $R^2$ are each independently hydrogen atom or methyl group; m is 0 or 1, n is 1 or 2 and m+n is 2; and o is 0 or 1, p is 1 or 2 and o+p is 2, the cured product containing a skeleton structure represented by the following formula 1:

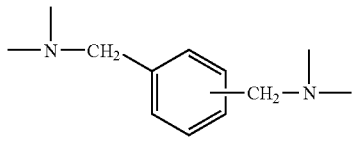
(1)

in an amount of 17% by weight or more.

2. The (meth)acrylate resin cured product according to claim 1, wherein X is a divalent group selected from the group consisting of —$CH_2$—$CH_2$—, —$CH(CH_3)$—$CH_2$—, —$CH_2$—$CH(OH)$—$CH_2$—, —$CH_2$—$C(CH_3)(OH)$—$CH_2$—, —$CH_2$—$CH(CH_2OH)$—, —$CH_2$—$C(CH_3)(CH_2OH)$— and —$(CH_2CH_2O)_2CH_2CH_2$—.

3. The (meth)acrylate resin cured product according to claim 1, wherein the (meth)acrylate derivative is a compound produced by the reaction of a xylylenediamine having (substituted) glycidyl groups on its nitrogen atoms and (meth)acrylic acid.

4. The (meth)acrylate resin cured product according to claim 1, wherein the (meth)acrylate derivative is a compound produced by the reaction of xylylenediamine and a (substituted) glycidyl (meth)acrylate.

5. The (meth)acrylate resin cured product according to claim 1, wherein the (meth)acrylate derivative is an urethane linkage-containing compound produced by the reaction of xylylene diisocyanate and a hydroxyalkyl (meth)acrylate.

6. The (meth)acrylate resin cured product according to claim 1, wherein the (meth)acrylate derivative is a compound produced by the reaction of a xylylene diamine-alkylene oxide adduct and an alkyl (meth)acrylate.

7. The (meth)acrylate resin cured product according to claim 1, which is in the form of a coating film.

8. The (meth)acrylate resin cured product according to claim 1, which is in the form of an adhesive layer.

9. The (meth)acrylate resin cured product according to claim 1, which is in the form of a film.

10. The (meth)acrylate resin cured product according to claim 1, wherein the cured product contains said skeletal structure represented by formula 1 in an amount of 17 to 70% by weight.

11. The (meth)acrylate resin cured product according to claim 1, wherein the cured product contains said skeletal structure represented by formula 1 in an amount of 18 to 60% by weight.

12. The (meth)acrylate resin cured product according to claim 1, which has gas barrier properties.

* * * * *